United States Patent
Fuerst et al.

(10) Patent No.: US 7,234,251 B2
(45) Date of Patent: Jun. 26, 2007

(54) TOE PROTECTION SANDAL

(75) Inventors: Rory W. Fuerst, Atherton, CA (US); Martin Keen, Jamestown, RI (US)

(73) Assignee: Keen LLC, Portland, OR (US)

( * ) Notice: Subject to any disclaimer, the term of this patent is extended or adjusted under 35 U.S.C. 154(b) by 0 days.

(21) Appl. No.: 10/393,675

(22) Filed: Mar. 19, 2003

(65) Prior Publication Data

US 2003/0182820 A1    Oct. 2, 2003

(51) Int. Cl.
    *A43C 13/14*    (2006.01)
(52) U.S. Cl. .................. 36/77 R; 36/72 R; 36/11.5
(58) Field of Classification Search .............. 36/11.5, 36/7.5, 8.1, 77 R, 77 M, 96, 72 R
    See application file for complete search history.

(56) References Cited

U.S. PATENT DOCUMENTS

| | | | |
|---|---|---|---|
| 114,340 A | 5/1871 | Prusha et al. | |
| 1,205,983 A * | 11/1916 | Emmerth | 36/7.5 |
| 1,386,028 A * | 8/1921 | Roe | 36/7.6 |
| D77,029 S | 11/1928 | Richter et al. | |
| 1,773,127 A | 8/1930 | Auster | |
| 1,803,554 A | 5/1931 | Knilans | |
| 2,185,762 A | 1/1940 | Cox | |
| 2,193,943 A | 3/1940 | Shea | |
| 2,283,273 A | 5/1942 | Marcy | |
| 2,297,595 A | 9/1942 | Weinstat | |
| 2,317,870 A | 4/1943 | Weinstat | |
| 2,327,322 A * | 8/1943 | Slater | 36/11.5 |
| 2,468,573 A | 4/1949 | Rimer | |
| D158,653 S | 5/1950 | Fenlason | |
| 2,583,826 A | 1/1952 | Fischer | |
| D172,251 S | 5/1954 | Salmeri | |
| 2,773,317 A | 12/1956 | Helle | |
| 2,981,010 A | 4/1961 | Aaskov | |
| 3,613,272 A * | 10/1971 | Fukuoka | 36/91 |
| 3,834,377 A * | 9/1974 | Lebold | 36/7.5 |
| 4,072,461 A | 2/1978 | Pirk | |
| 4,132,016 A | 1/1979 | Vaccari | |
| 4,177,583 A * | 12/1979 | Chapman | 36/77 R |
| 4,535,554 A | 8/1985 | De Obaldia B. | |
| 5,331,751 A * | 7/1994 | Harwood | 36/77 R |
| 5,469,638 A | 11/1995 | Crawford, III | |
| D373,674 S | 9/1996 | Dolinsky | |
| 5,836,090 A * | 11/1998 | Smith | 36/11.5 |
| 5,901,394 A | 5/1999 | Greenawalt | |
| D412,777 S | 8/1999 | Norton et al. | |
| D425,292 S | 5/2000 | Matis | |

(Continued)

FOREIGN PATENT DOCUMENTS

FR        718 801         1/1932

(Continued)

*Primary Examiner*—Ted Kavanaugh
(74) *Attorney, Agent, or Firm*—Perkins Coie LLP

(57) ABSTRACT

A sandal including a molded rubber outsole configured to support a lower surface of a foot including a heel, midfoot, and a forefoot; a toe cap extending from the outsole and configured to cover a top of at least a portion of the forefoot, the toe cap molded integrally with the outsole; and a plurality of sandal straps fixed to the outsole to retain the sandal on the foot, at least one of the sandal straps fixed to the toe.

37 Claims, 16 Drawing Sheets

U.S. PATENT DOCUMENTS

| | | |
|---|---|---|
| D440,034 S | 4/2001 | Matis |
| 6,237,249 B1 * | 5/2001 | Aguerre ..................... 36/11.5 |
| 6,298,583 B1 | 10/2001 | Allen |
| 6,493,965 B1 | 12/2002 | Bathum |
| 2002/0148142 A1 | 10/2002 | Oorei et al. |

FOREIGN PATENT DOCUMENTS

| | | |
|---|---|---|
| FR | 2 478 442 | 9/1981 |
| GB | 138623 | 7/1920 |

* cited by examiner

TOE PROTECTION SANDAL

FIELD OF THE INVENTION

The invention relates to footwear, and more particularly the invention relates to a sandal with a toe cap for toe protection, and a method of manufacturing the same.

DESCRIPTION OF THE RELATED ART

Sandals are available in a wide variety of constructions. A conventional sandal includes a strapping system secured to a sole. The sole engages the wearer's foot and forms the wear surface of the sandal. Meanwhile, the strapping system secures the sole to the wearer's foot, typically using separate ankle, heel and forefoot straps.

The straps are secured to the sole primarily using one of two different construction techniques. The first of these techniques is a stitching technique in which the lower ends of the straps or the posts are stitched directly to the sole. This technique is relatively inexpensive, however, it may not provide the durability needed for certain applications. Further, this technique is essentially limited to use with strap materials that are capable of being stitched, such as leather, woven or textile straps. This construction technique, however, is not well suited for use with rigid, non-pliable materials. In some applications, the stitching is replaced by staples or tacks. In general, these alternative constructions suffer from the same problems as the stitched construction.

A second technique for securing the straps to the sole is an adhesive construction in which the strap ends are cemented or adhesively secured to the sole. The adhesive construction generally provides improved durability and is well suited for use with relatively rigid post materials, such as thermoplastic elastomers.

On the other hand, shoes and boots are traditionally fabricated by shaping the footwear over a last. A last is a three-dimensional shape of the inside cavity of a boot or shoe. The upper and sole are generally placed over the last in pieces or assemblies and secured together. A preassembled component upper consists of various layers of fabric and/or leather material sewn and/or glued together to form the upper or a portion of the upper shoe.

The rigidity and flexibility characteristics of the footwear are achieved by interposing the various layers of materials having suitable mechanical properties in specific regions of the footwear. In one typical assembly process, an insole is positioned on the top portion of the inverted last, which represents the inside bottom part of the article of footwear and the preassembled fabric component is then positioned over the last. The fabric components are stretched over the last and pushed over the insole to conform to the specific shape of the last and then nailed, tacked, and/or glued to the insole to maintain the desired shape. Often rigid plastic components are added to the sole construction to increase the strength and support of the footwear in specific areas. The footwear is usually completed with a midsole or cushioning and then an outsole nailed, tacked and/or glued to the assembly of components on the last.

Some of the sandal constructions are intended to solve specific problems created by certain environments. For example, one involved in activities around the water needs a sandal which provide adequate support, is comfortable and remains secure even after walking substantial distances. On the other hand, one involved in light hiking or other activities exposing the sandal to extreme terrain might want more of shoe with a sandal like feel and freedom. However, with traditional sandal manufacturing and assembly, the consistency of the sandal has varied from sandal to sandal. Thus, the consumer could not always be guaranteed that each size 9 would fit the same.

Accordingly, what is need is a sandal that is manufactured and assembled like a shoe for consistency and standardization of sizing. In addition, it would be desirable for a sandal having shoe like construction that not only provides durability and protection to the wearer's foot including toe protection but also the comfort and style of a sandal.

SUMMARY OF THE INVENTION

The present invention relates to footwear, and more particularly the invention relates to a sandal with a toe cap for toe protection, and a method of manufacturing the same.

In accordance with one aspect of the present invention, a sandal including a molded rubber outsole configured to support a lower surface of a foot including a heel, midfoot, and a forefoot; a toe cap extending from the outsole and configured to cover a top of at least a portion of the forefoot, the toe cap molded integrally with the outsole; and a plurality of sandal straps fixed to the outsole to retain the sandal on the foot, at least one of the sandal straps fixed to the toe cap.

In accordance with another aspect of the present invention, a sandal including a molded rubber outsole configured to support a lower surface of a foot including a heel, midfoot, and a forefoot; a toe cap extending from the outsole and configured to cover a top of at least a portion of the forefoot, the toe cap molded integrally with the outsole; and a plurality of sandal straps fixed to the outsole to retain the sandal on the foot, at least one of the sandal straps fixed to the toe cap.

In accordance with a further aspect of the present invention, a mold for manufacturing an outsole of a sandal, including a bottom plate, the bottom plate configured to form a lower surface of the outsole; an inner toe cap plate, the inner toe cap plate configured to form an upper surface of the outsole including an inner cavity of a toe cap; and an outer toe cap plate, the outer toe cap plate configured to form an outer surface of the toe cap.

In accordance with another aspect of the present invention, a method for the production of a molded outsole, the outsole having a toe cap extending from the outsole and configured to cover a top of at least a portion of the forefoot, the toe cap molded integrally with the outsole, the method including the steps of placing a first material in a first mold cavity, the first mold cavity formed between a bottom plate and an inner toe cap plate; closing the first mold cavity; placing the first material in a second mold cavity, the second mold cavity formed between the bottom plate and an outer toe plate; closing the second mold cavity; and curing the first material to form the outsole.

BRIEF DESCRIPTION OF THE DRAWING FIGURES

The invention will now be described in greater detail with reference to the preferred embodiments illustrated in the accompanying drawings, in which like elements bear like reference numerals, and wherein.

DETAILED DESCRIPTION OF THE INVENTION

Figure 1:
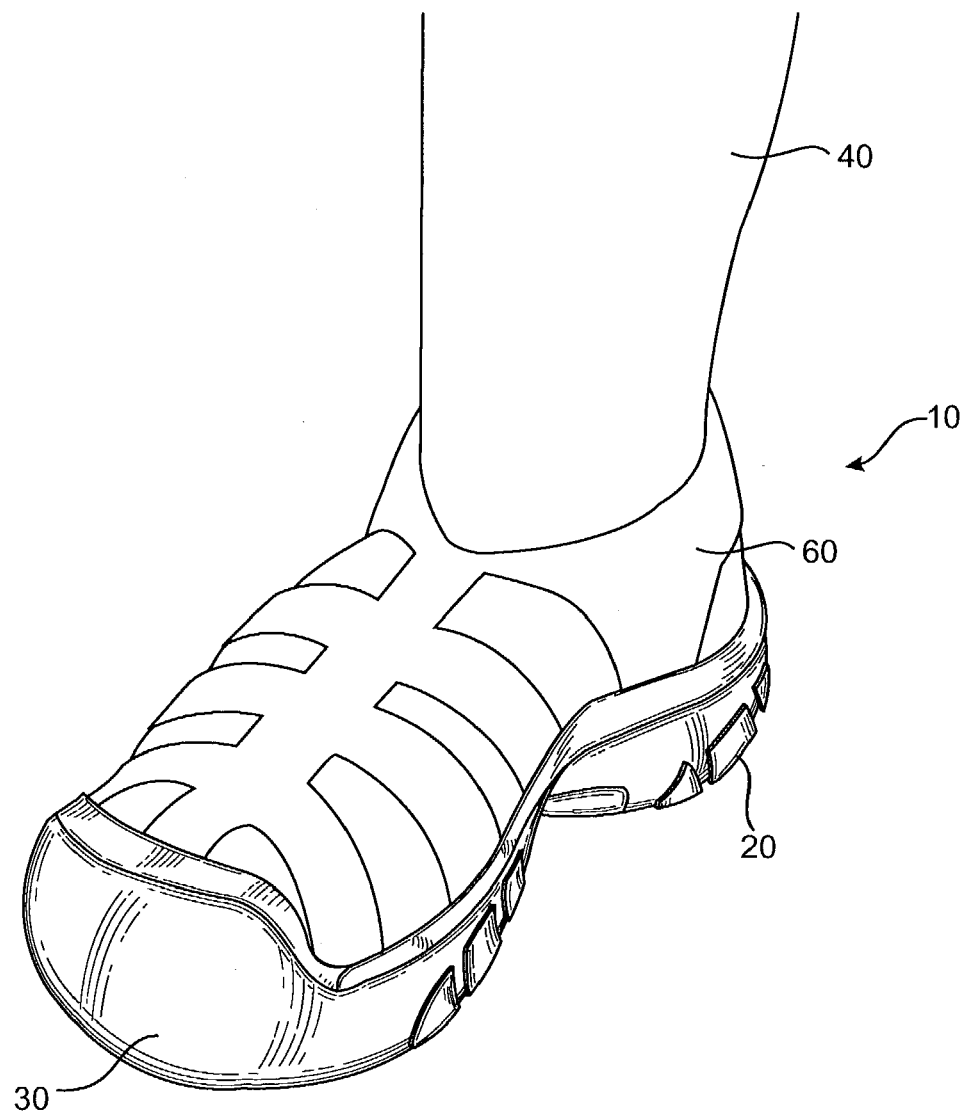
FIG. 1 is a perspective view of a sandal according to one embodiment of the present invention.

Referring to the drawings, wherein like numerals indicate like elements, a sandal in accordance with the present invention is illustrated. The accompanying figures illustrate the sandal intended for use on the right foot of a wearer. The preferred embodiment also includes a left sandal, such sandal being the mirror image of the right.

Turning to the drawings, a sandal 10 in accordance with one exemplary embodiment of this invention is shown in FIG. 1. The sandal 10 includes a molded rubber outsole 20 including a toe cap 30 and a plurality of straps 60 to retain the sandal on the foot 40.

Figure 2:
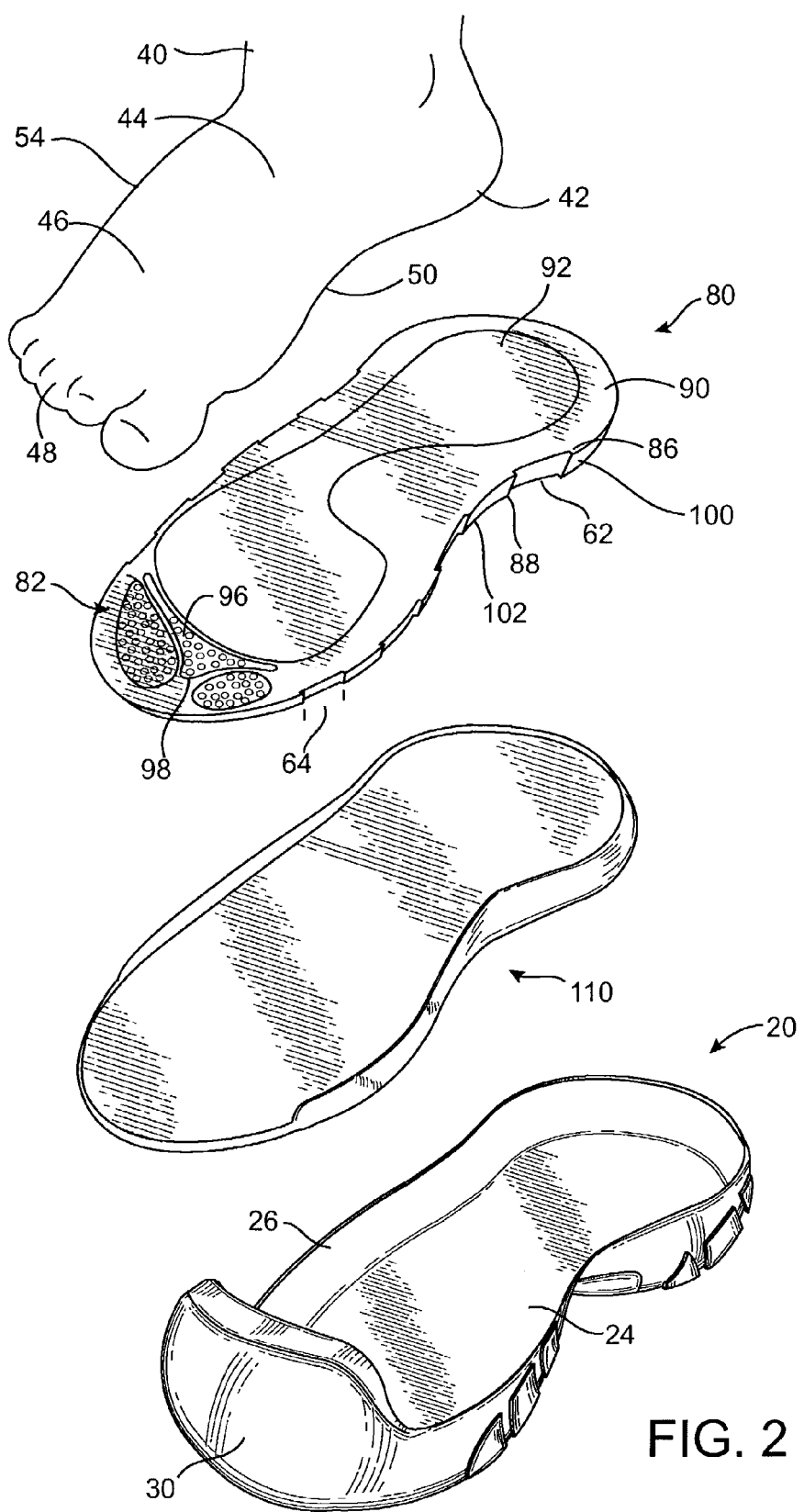
FIG. 2 is an exploded perspective view of the sandal of FIG. 1.

As shown in FIGS. 1 and 2, the sandal 10 includes a molded rubber outsole 20 configured to support a lower surface 50 of a foot 40 including a heel 42, a midfoot 44, and a forefoot 46. The sandal 10 also includes a toe cap 30 extending from the outsole 20 and configured to cover a top 52 of at least a portion of the forefoot 46. The toe cap 30 is molded integrally with the outsole 20. The plurality of sandal straps 60 are fixed to the outsole 20 and retain the sandal 10 on the foot 40. In a preferred embodiment of this invention at least one of the sandal straps 60 is fixed to the toe cap 30.

The lower surface 50 of the foot 40 rests on an upper surface 92 of the insole 80. The foot 40 also includes the heel 42, midfoot 44, the forefoot 46 and the toes 48.

The insole 80 provides support and comfort and is shaped to match the contours of the lower surface 50 of the foot 40. In a preferred embodiment, the insole has a raised arch and forefoot, and a slightly concave heel. The upper surface 92 of the insole 80 may be textured 94 or even contoured 96 to reduce the likelihood of movement between the insole 80 and the foot 40. For example, a gradual ridge 98 may extend along the upper surface 92 of the insole 80 between the forefoot 46 and toe 48 regions of the foot 40.

The insole 80 has a plurality of strap receiving grooves formed in a lower surface of the insole 80. The plurality of sandal straps are configured to retain the sandal 10 on the foot 40 and are fixed in the strap receiving grooves 62 between the outsole 20 and the insole 80. The molded rubber outsole 20 includes the toe cap 30 extending from the outsole 20 and configured to cover the top surface 52 of at least a portion of the forefoot 46 including the toes 48

The insole 80 preferably includes an anatomic footbed 90 and an inner midsole 100. The anatomic footbed 90 is designed to be substantially coextensive with the lower surface 50 of the foot 40. The anatomically designed footbed 90 follows the natural contour of the foot 40 providing added comfort and support. The anatomic footbed 90 is preferably made of an anti-odor material such as Aegis™ anti-microbial. The anti-odor material such as Aegis™ provides odor fighting protection to assist with extending the life of the sandal 10. However, it can be appreciated that the anatomic footbed 90 can be made of leather, a synthetic having a leather like appearance and feel, rubber or nylon depending on the type of sandal and use therein.

The inner midsole 100 is positioned between the anatomic footbed 90 and the outsole 20. The inner midsole 100 has a plurality of strap receiving grooves 62 formed in a side surface 102 of the inner midsole 100. The plurality of straps 60 extend over the top 54 of the foot 40 into the strap receiving grooves 62. The straps 60 have a strap end 78 which is positioned between the inner midsole 100 and the outsole 20. The straps 60 are fixed in the strap receiving grooves 62 and between the inner midsole 100 and the outsole 20 by glue, stitching, or other conventional techniques.

The strap receiving grooves 62 each have a width 64 substantially equal to a width 74 of the corresponding straps 60 and a depth 66 substantially equal to a depth 76 of the corresponding straps 60. The strap receiving grooves 62 extend from a top edge 86 of the footbed 90 toward a bottom edge 88 of the inner midsole 100. The strap receiving grooves 62 then extend from the bottom edge 88 of the inner midsole 100 towards a center line of a lower surface 104 of the inner midsole 100. The footbed 90 has an upper foot supporting surface 92 which is substantially even with an upper edge 36 of the side surface 26 of the inner midsole 100.

Figure 3:
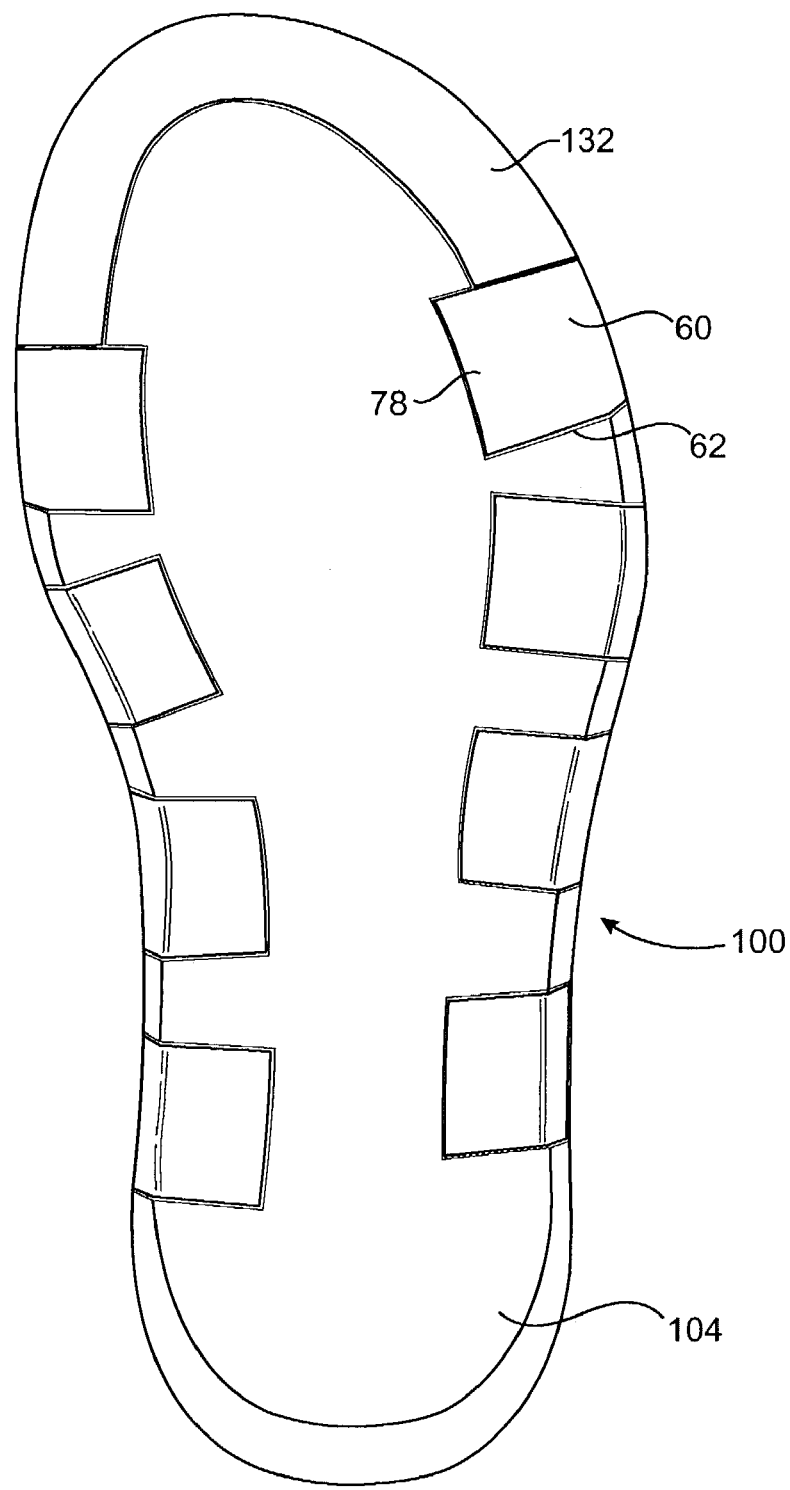
FIG. 3 is a bottom plan view of the inner midsole of the sandal of FIG. 1.

As shown in FIG. 3, a bottom plan view of the inner midsole 100, the strap receiving grooves 62 extend from an outer edge of the inner midsole 100 towards a center line of the inner midsole 100. The strap ends 78 are fixed in the strap receiving grooves 62 by glue, cement, or stitching or any combination of glue, cement and/or stitching. The strap receiving grooves 62 provide a pattern, a guide, or index for the assembler to fix the straps to the inner midsole 100. The indexing of the straps 60 in the strap receiving grooves 62 provides standardization or uniformity to allow each and every sandal to be manufactured and assembled within a certain tolerance. Thus, by properly indexing the strap ends 78 in the strap receiving grooves 62 with the ends of the straps abutting the ends of the grooves, a consistent sandal 10 is manufactured to design tolerances which are not usually found in sandals. For example, all size 9s should be manufactured within permitted tolerances such that each sandal should fit essentially the same providing uniformity in sizing. This provides the customer with a quality product that the end user can rely on from sandal to sandal.

The inner midsole 100 is preferably made of a soft, foam-like material, such as a thermoplastic synthetic resin foam, such as an ethylene-vinyl acetate copolymer (EVA), thermosetting resin foam, such as polyurethane (PU), or rubber material foam, such as butadiene or chloroprene rubber. For example, in a preferred embodiment the inner midsole is a foam EVA material, and more preferably phylon.

The molded rubber outsole 20 includes the toe cap 30 extending from the outsole 20 and configured to cover the top surface 54 of at least a portion of the forefoot 46 including the toes 48. The toe cap 30 prevents foreign objects such as rocks and other debris from entering the sandal and further provides added protection to the foot 40 from scrapes and other contact with rocks and other items.

The molded rubber outsole 20 is configured to support the lower surface of the foot 40 including the heel 42, midfoot 44, and forefoot 46. The outsole 20 has a side surface 26 which defines the lateral and medial sides of the outsole 20.

In a preferred embodiment of the present invention, an outer midsole 110 is positioned between the insole 80 and the outsole 20. The outer midsole 110 provides cushioning to the sandal 10. The outer midsole 110 is preferably a shock absorbing foam-like material, such as a thermoplastic synthetic resin foam, such as an ethylene-vinyl acetate copolymer (EVA), thermosetting resin foam, such as polyurethane (PU), or rubber material foam, such as butadiene or chloroprene rubber. The outer midsole 110 can also include a natural cork material or a synthetic cork material like EVA. It will be appreciated that the materials as set forth herein are not limiting and that the outer midsole 110, and the sandal 10 as described herein works with a wide range of materials. The outer midsole 110 preferably has a hardness of approximately 40 to 60 on the Asker C scale. However, the outer midsole 110 can be from a relatively firm foam material having a hardness of approximately of 50 to 70 on the Asker C scale.

Figure 4:
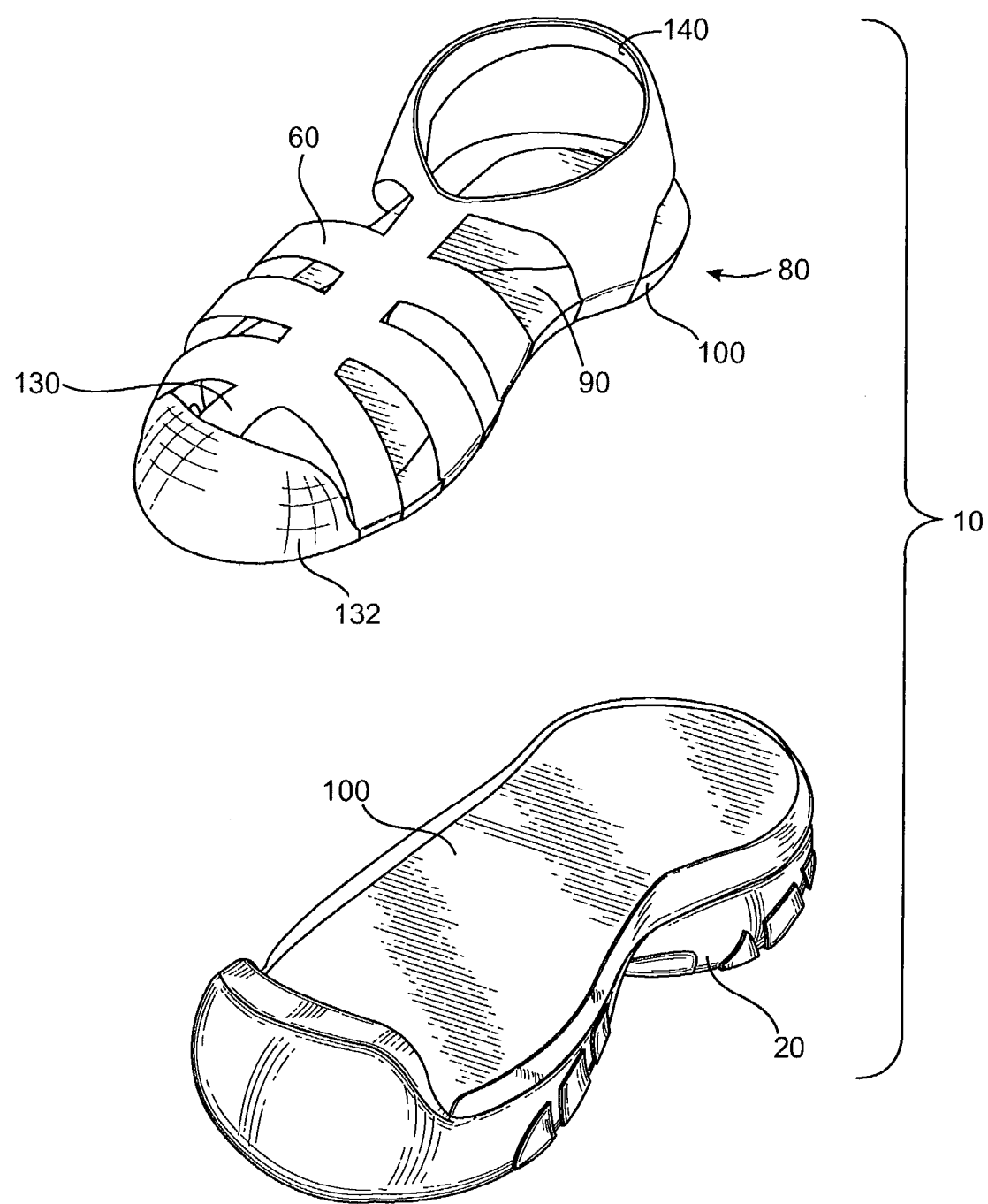
FIG. 4 is an exploded perspective view of the sandal of FIG. 1.

As shown in FIG. 4, the sandal straps 60 are fixed the insole 80 forming an upper 140. In a preferred embodiment of the present invention, a nylon like material forms a toe cap lining 132 which is configured to fit inside the toe cap 30.

Figure 5:
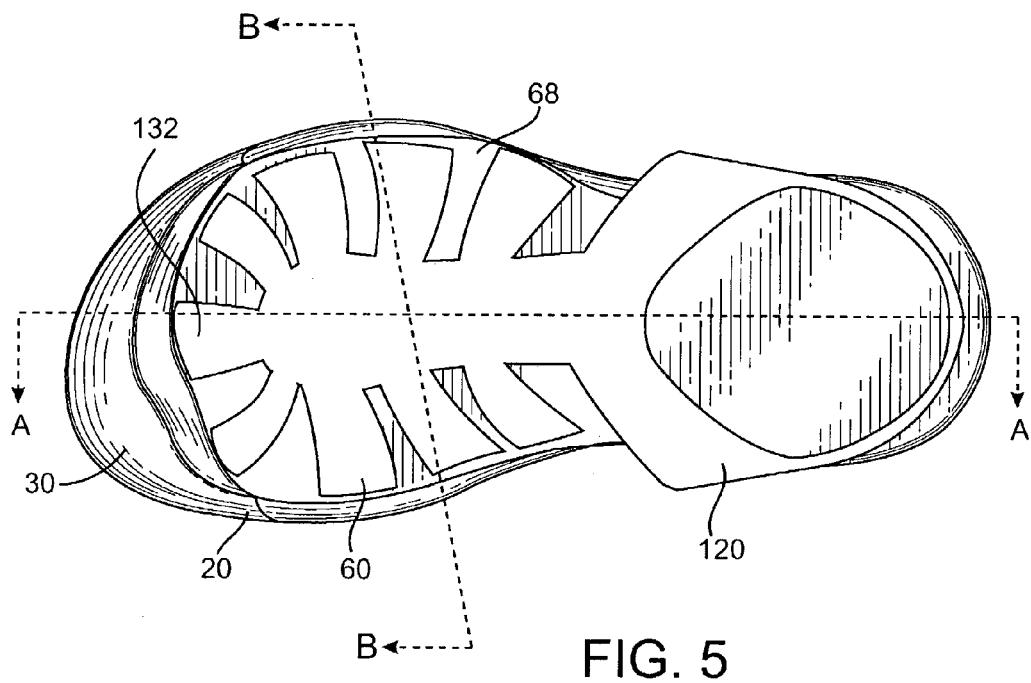
FIG. 5 is a top plan view of the sandal of FIG. 1.

FIG. 5 shows a top plan view of one embodiment of the present invention. As shown in FIG. 5, the sandal 10 of FIG. 1 has a plurality of sandal straps 60 which are separated by sandal openings 68 through which the foot 40 inside the sandal 10 is exposed to the exterior of the sandal 10. The sandal straps 60 and sandal openings 68 are geometrically positioned to not only provide support and comfort, but also provides an aesthetic appearance of the sandal 10. The sandal straps 60 includes at least one strap 132 fixed to the toe cap 30.

Figure 6:
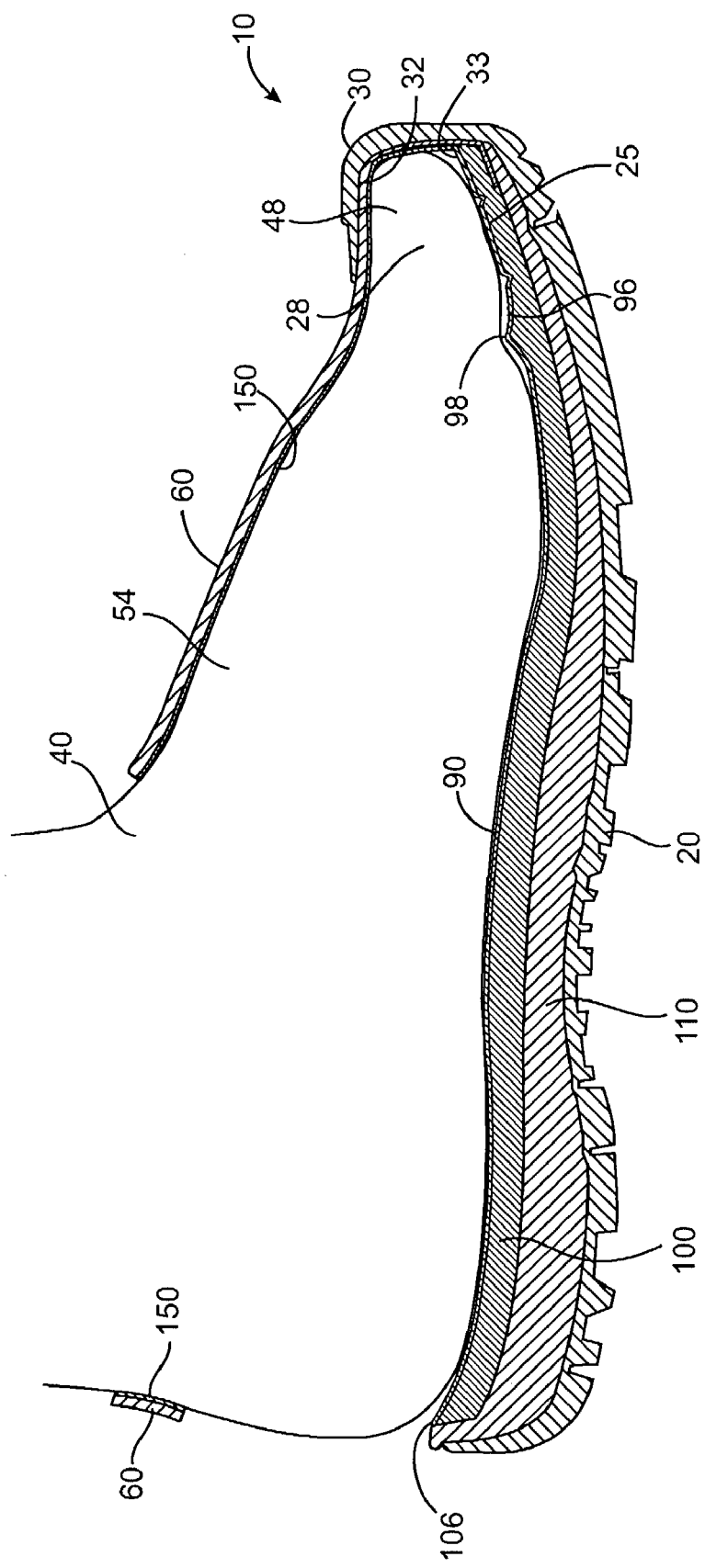
FIG. 6 is a cross-sectional view of the sandal of FIG. 5 taken along the line A—A.

The straps 60 are fixed to the outsole 20 to retain the sandal 10 on the foot 40. In a preferred embodiment, as shown in FIGS. 5 and 6, at least one of the sandal straps 60 is fixed to the lower surface 32 of the toe cap 30. It can be appreciated that in an alternative embodiment of the present invention, at least one of the toes straps 60 can be fixed to the upper surface 34 of the toe cap 30, rather than the lower surface 32 of the toe cap 30. The sandal straps 60 are preferably fixed to the toe cap 30 by glue. However, it can be appreciated that the sandal straps 60 can be fixed to the toe cap 30 by stitching or any other known method of construction known to one skilled in the art.

The sandal straps 60 cover the top 54 of the foot 40. The sandal straps 60 are preferably made of nylon, canvas, leather or other synthetic material. In addition, it can be appreciated that the sandal straps 60 can be made from a combination of nylon, canvas, leather or other synthetic material including a lining 150 for added comfort and aesthetic appearance. In one embodiment, the sandal straps 60 are a water proof leather with an anti-odor lining 150. The sandal straps 60 preferably includes a rear strap assembly 120 which supports the back portion of the heel 42 of the foot 40.

In a preferred embodiment of the present invention, the sandal straps 60 have a layered construction, including a neoprene or neoprene-like lining 150 overlapping leather, synthetic leather or nylon straps. The lining 150 is usually stitched or glued to the leather, synthetic leather or nylon outer surface of the straps 60. The lining 150 is preferably coextensive with exposed inner surfaces of straps 60 to provide a comfortable, cushioning contact between the foot 40 and the sandal 10.

FIG. 6 is a cross-section of the sandal of FIG. 5 taken along the line A—A. As shown in FIG. 6, the sandal 10 includes the anatomic footbed 90, the inner midsole 100, the outer midsole 110, and the outsole 20. The outsole 20 includes the toe cap 30 which protects the toes 48 and forefoot 46. The toe cap 30 includes a lower surface 32 facing a top surface 25 of the footbed 90 and spaced from the footbed 90. The lower surface 32 of the toe cap 30 and the top surface 25 of the footbed 90 forms an inner cavity 28 of the toe cap 30. The inner cavity 28 protects the toes 48 from foreign objects such as rocks. In a preferred embodiment, the toe cap 30 covers a top of at least one half of the length of at least three toes 48. The footbed 90 including the inner midsole 100 is fixed entirely within the inner cavity 28 of the molded rubber outsole 20 and between the side surfaces 26.

As shown in FIG. 6, the footbed 90 extends to the inner surface 33 of the toe cap 30. The upper surface 92 of the insole 80 may be contoured 96 to reduce the likelihood of movement between the insole 80 and the foot 40. For example, a gradual ridge 98 may extend along the upper surface 92 of the insole 80 between the forefoot 46 and toe 48 regions of the foot 40. Meanwhile in the heel portion of the sandal 10, the footbed 90 extends to a back edge 106 of the inner midsole 100. Typically, the soft foam-like elements of the outer midsole 110 will have a greater thickness in the heel 42 of the sandal 10 than the forefoot 46 portion, due to the fact that the heel 42 of the foot 40 initially contacts the ground, before the forefoot 46.

Figure 7:
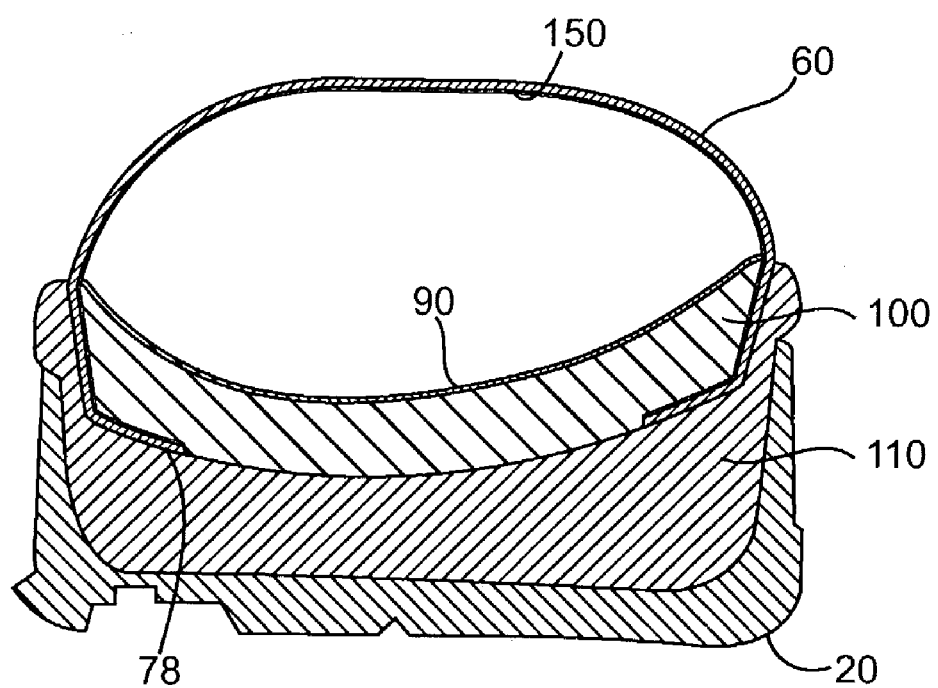
FIG. 7 is a cross-sectional view of the sandal of FIG. 5 taken along the line B—B.

FIG. 7 is a cross-sectional view of the sandal of FIG. 4 taken along the line B—B. As shown in FIG. 7, the plurality of straps 60 extend downward through the plurality of strap receiving grooves 62 formed in the insole 80 including the footbed 90 and the inner midsole 100 and to the lower surface 84 of the inner midsole 100. The straps 60 are fixed in the strap receiving grooves 62 by glue, stitching, or other conventional techniques. The outsole 20 including the outer midsole 110 is preferably glued, cemented or otherwise adhesively secured to the lower surface of the inner midsole 100.

Figure 8:
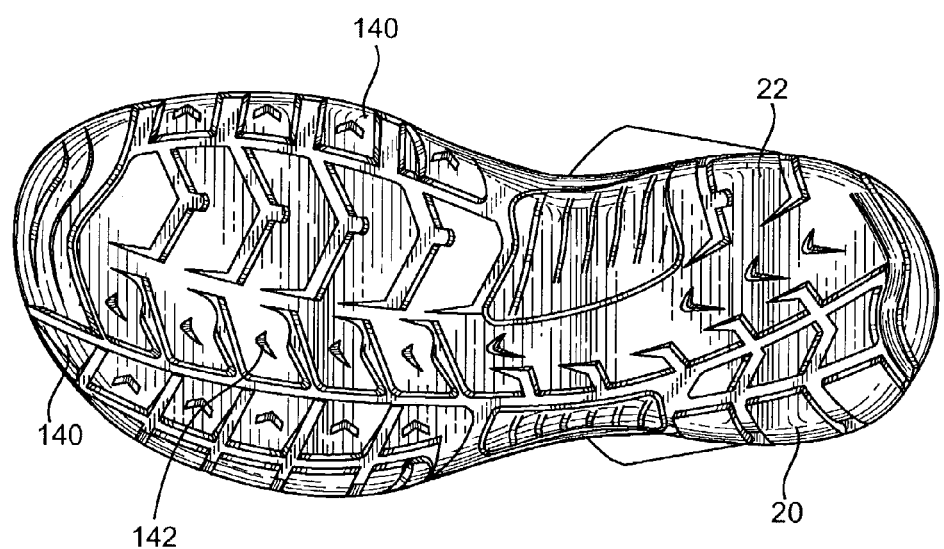
FIG. 8 is a bottom plan view of the sandal of FIG. 1

FIG. 8 shows a bottom plan view of the sandal of FIG. 1. The outsole is also anatomically designed to conform to the natural shape of the foot. The outsole 20 is preferably manufactured from a durable material such as molded rubber or a synthetic material having rubber-like properties. In a preferred embodiment of the present invention, the outsole 20 is manufactured from a carbon rubber. The carbon rubber is non-marking so as to avoid those troublesome and annoying black marks that many rubbers provide. Furthermore, the outsole 20 includes at least two colors for both aesthetic appearance and function when rubber of different durometer or hardness is used.

Examples of rubber or synthetic materials for the outsole 20 include materials with rubber-elastic properties, such as natural or synthetic rubber, synthetic resinous material made of rubber-elastic by the addition of suitable hardeners, preferably on the basis of polyurethane, epoxy resins, or the like. The outsole 20 will have a durometer of approximately 25 to 75 Shore D depending on the article of footwear. If a soft or flexible outsole 16 is desired for certain types of sandal in which flexibility is a major requirement, i.e., the hardness of the outsole 20 will generally not exceed 50 Shore D. However, if a firmer outsole 20 is desired, a hardness of greater than 50 Shore D is often used.

As shown in FIG. 8, a lower surface 22 of the outsole 20 has a number of traction elements 140 spaced about the lower surface 22 of the outsole 20. In addition, a knife cut siping 142 for wet traction is incorporated into the outsole 20. The outsole 20 also preferably includes a multi-terrain lug sole. In addition, it can be appreciated that the outsole 20 can be textured or roughened to improve traction.

The outsole 20 as shown in FIG. 8 is only one of several designs for the outsole 20. For example, U.S. Design patent application Ser. Nos. 29/162,882 and 29/162,883, filed on Jun. 19, 2002, show several outsoles 20 that could be used with an article of footwear as described herein and are incorporated in their entirety by reference.

Figure 9:
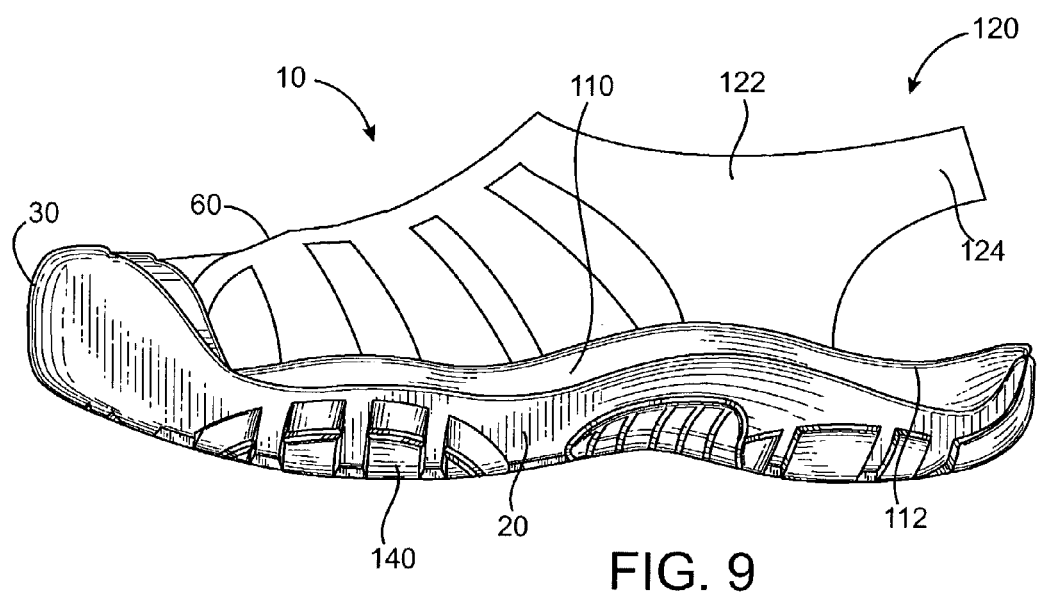
FIG. 9 is a side view of the medial side of the sandal of FIG. 1.

FIG. 9 is a side view of the medial side (the inside of the foot) of the sandal of FIG. 1. As shown in FIG. 9, the medial side of the sandal 10 includes the outsole 20, the toe cap 30, the outer midsole 110, and the sandal straps 60. The footbed 90 (not shown) and the inner midsole 100 (not shown) are positioned below an upper edge 112 of the outer midsole 110. The sandal straps 60 include a rear strap assembly 120 including a ankle strap 122 and a heel strap 124. The ankle strap 122 and heel strap 124 help retain the foot 40 within the sandal 10. The ankle strap 122 and the heel strap 124 are preferably integrated into a single component. As shown in FIG. 9, the outsole 20 preferably includes cleats or traction elements 140 on the exterior surface 38 of the outsole 20.

Figure 10:
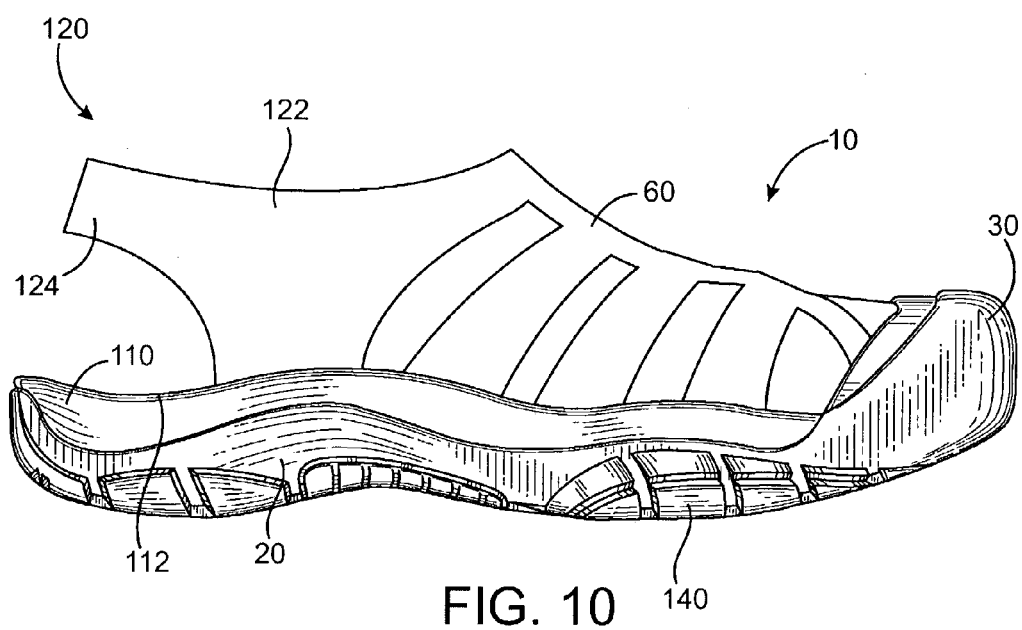
FIG. 10 is a side view of the lateral side of the sandal of FIG. 1.

FIG. 10 is a side view of the lateral side (the outside of the foot) of the sandal of FIG. 1.

Figure 11:
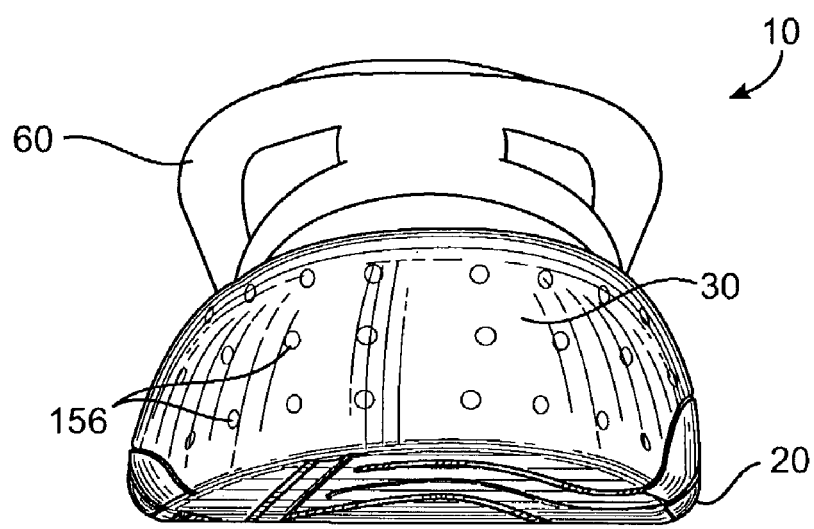
FIG. 11 is a front view of the toe cap of the sandal of FIG. 1.

FIG. 11 is a front view of the toe cap of the sandal of FIG. 1. The toe cap 30 preferably has a texture similar to that of the remainder of the outsole 20. However, as shown in FIG. 10, the toe cap 30 can have added texture 156 for added protection and traction.

The toe cap 30 is preferably constructed from the same material as the outsole 20, however, it can be appreciated that the outsole 20 and toe cap 30 can be constructed from different materials. The different materials can having similar properties such as hardness, flexibility, and texture or in an alternative embodiment, the toe cap 30 and outsole 20 are constructed from different materials having different properties. For example, the toe cap 30 may include a synthetic butadiene rubber to prevent the toe cap 30 from oxidizing, dry out and cracking.

In one embodiment of the present invention, the toe cap 30 is reinforced with an additive for added protection and to prevent the toe cap 30 from cracking. In one preferred embodiment, the additive is a fiberglass material or synthetic material. It can be appreciated that the additive can be a thermoplastic resin such as thermoplastic polyurethane (TPU) of comparatively rich elasticity, polyamide elastomer (PAE), ABS resin, or the like. Alternatively, the additive can be formed from a thermosetting resin such as an epoxy resin, an unsaturated polyester resin or the like. Meanwhile, a nylon or nylon derivative can provide added protection to prevent the toe cap 30 from cracking under normal wear.

Figure 12:
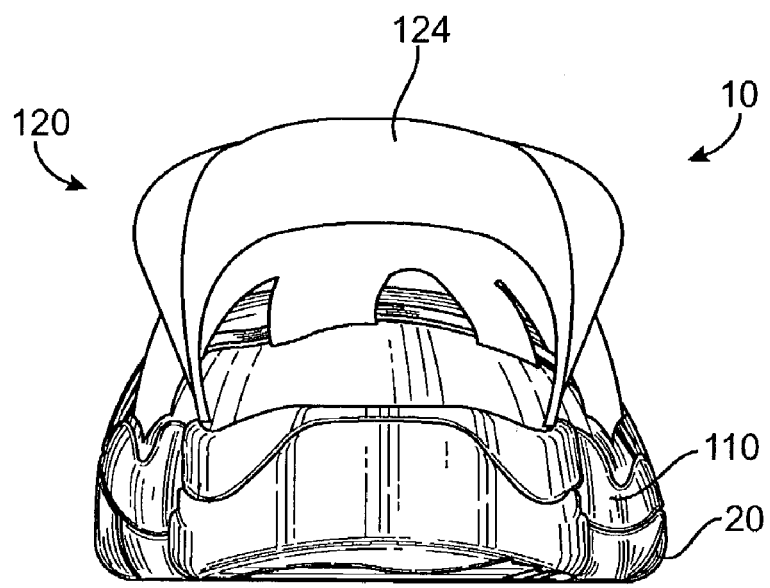
FIG. 12 is a back view of the heel of the sandal of FIG. 1.

FIG. 12 is a back view of the heel of the sandal 10 of FIG. 1. The heel includes a rear strap assembly 120 including the heel strap 124.

Figure 13:
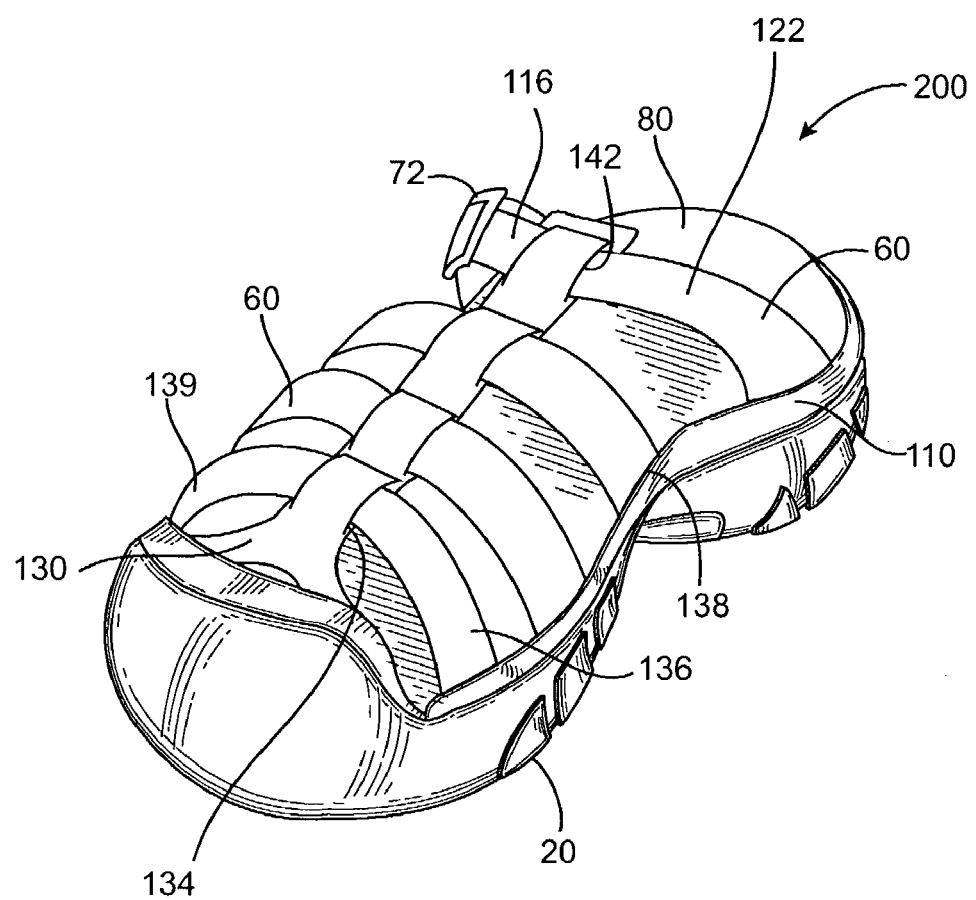
FIG. 13 is a perspective view of a sandal according to an alternative embodiment of the present invention.

FIG. 13 is an alternative embodiment of a sandal 200 according to the present invention having an open heel. The sandal 200 includes a molded rubber outsole 20 configured to support a lower surface 50 of a foot 40 including a heel 42, a midfoot 44, and a forefoot 46. The molded rubber outsole 20 including the toe cap 30 and a plurality of straps 60 to retain the sandal 200 on the foot 40. The toe cap 30 extends from the outsole 20 and configured to cover a top of at least a portion of the forefoot. The toe cap is molded integrally with the outsole 20. The plurality of sandal straps 60 are fixed to the outsole 20 to retain the sandal 200 on the foot 40. At least one of the sandal straps 60 is fixed to the toe cap 32.

The sandal straps 60 include a first strap 130 which extends from the toe cap 30 to the ankle of the foot 40. The first strap 130 is fixed to the toe cap 30 by at least one strap. As shown in FIG. 13, the first strap includes at least two straps which are fixed to the lower surface of the toe cap 30. The first strap 130 has a plurality of openings 134 for receiving a plurality of side straps 136. The side straps 136 extend from the lateral edge 138 of the outsole/insole through the openings 134 to the medial edge 139 of the outsole 20 and insole 80.

The sandal straps 60 also include an ankle strap 122 extending from the lateral edge of the outsole 20 through the opening 142 in the first strap 130 to the medial edge of the outsole 20. The ankle strap 122 also preferably includes an adjustable length strap 116 that is secured to the ankle assembly 122 by a fastener 72.

The fastener 72 is preferably a buckle, a clasp, a hook-and-loop or a velcro strap of some type to allow the sandal 10 to expand to allow the foot 40 to enter the sandal 10 and also retain the sandal 10 of the foot 40. The fastener 72 is tightened to a sufficient snugness according to the activity. It can be appreciated that any type of fastener 72 can be used.

Figure 14:
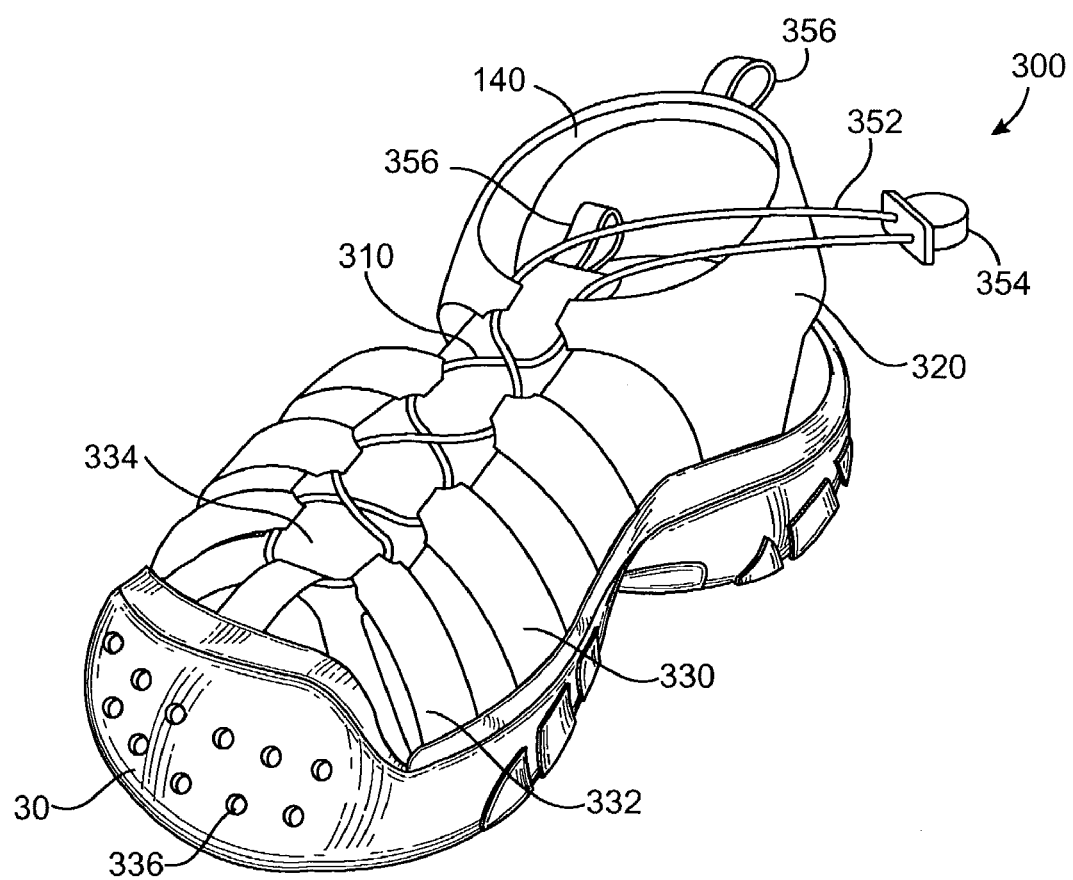
FIG. 14 is a perspective view of a sandal according to another embodiment of the present invention.

FIG. 14 is another embodiment of a sandal 300 according to the present invention having a plurality of sandal straps with a lacing system 310. The sandal 310 includes an upper 320 having a plurality of sandal straps 330. The sandal straps 330 includes a plurality of side straps 332 and a tongue 334. The side straps 332 extend from the lower surface of the insole 80 through the strap receiving grooves to a position on the side of the foot 40. The side straps 332 have an opening for receiving the lacing system 310. The tongue 334 extends from the toe cap 30 over the top portion of the foot 40. The side straps 332 and the tongue 334 are fixed to one another by a lining. The lining is preferably an anti-odor lining form for an hydro-phobic foam. For example, the anti-odor lining can be the Aegis™ anti-microbial lining. The sandal straps 330 preferably have a layered construction, including a neoprene or neoprene-like lining 140 overlapping leather, synthetic leather or nylon straps. The lining 140 is usually stitched or glued or a combination thereof to the leather, synthetic leather or nylon outer surface of the straps 330. The lining 140 is preferably coextensive with exposed inner surfaces of straps 330 to provide a comfortable, cushioning contact between the foot 40 and the sandal 300.

In a preferred embodiment of the present invention, the upper 320 includes a toe cap liner 132. The toe cap liner 132 provides added comfort and protection to the toes 48. The sandal straps 330 are connected to one another by the lacing system 310. The lacing system preferably includes a quick lock lace system having an elastic lace string 352 with a quick lock control device 354. The quick lock control device 354 allows for easy adjustment of the lacing system 310. It can be appreciated that the lacing system 310 can be nylon, leather or synthetic material which can be used to lace the sandal straps 330 to one another.

The tongue 342 and the back of the heel strap 350 preferably includes a pull loop 356. The pull loop 356 is preferably a reflective material such as the 3M™ reflective pull loop. However, it can be appreciated that any type of pull loop 356 can be used.

In an alternative embodiment as shown in FIG. 14, the toe cap 30 includes a plurality of holes 336. The plurality of holes 336 allow water to drain from the inner cavity 28 of the toe cap 30.

Figure 15:
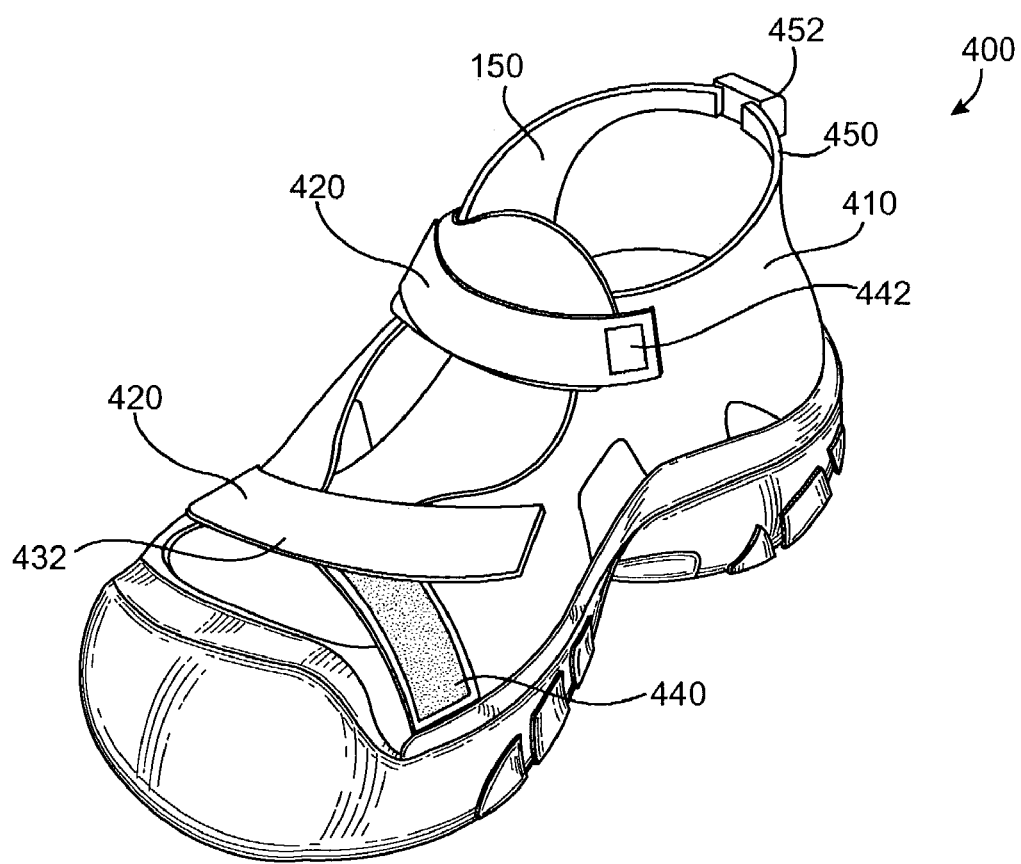
FIG. 15 is a perspective view of a sandal according to an alternative embodiment of the present invention.

FIG. 15 is an alternative embodiment of a sandal 400 according to the present invention having an upper 410 having a plurality of adjustable sandal straps 420. The upper 410 includes the plurality of adjustable sandal straps 410 located over the forefoot 46 and the midfoot 44 of the foot 40. The adjustable straps 430 preferably have a layered construction, including a neoprene or neoprene-like lining 150 overlapping leather, synthetic leather or nylon straps 432. The lining 150 is usually stitched or glued or a combination thereof to the leather, synthetic leather or nylon outer surface of the straps 420. A velcro strap is 440 then added to the plurality of adjustable straps 420 so that the fit of the sandal can be adjusted. As with the other sandals mentioned herein, the lining 150 is preferably coextensive with exposed inner surfaces of straps to provide a comfortable, cushioning contact between the foot 40 and the sandal 400. In a preferred embodiment, the adjustable sandal straps 420 include a fastener 442. The fastener 442 is preferably a snap or hook, however, it can be appreciated that any type of fastener 442 can be used.

In addition, the heel strap 450 can include a means for adjusting the heel strap 450. For example, as shown in FIG. 15, a quick lock device 452 is used as a means for adjusting the heel strap 450. In addition, it can be appreciated that a velcro strap or a tie of some type can be used as the means for adjusting the heel strap 450.

Figure 16:
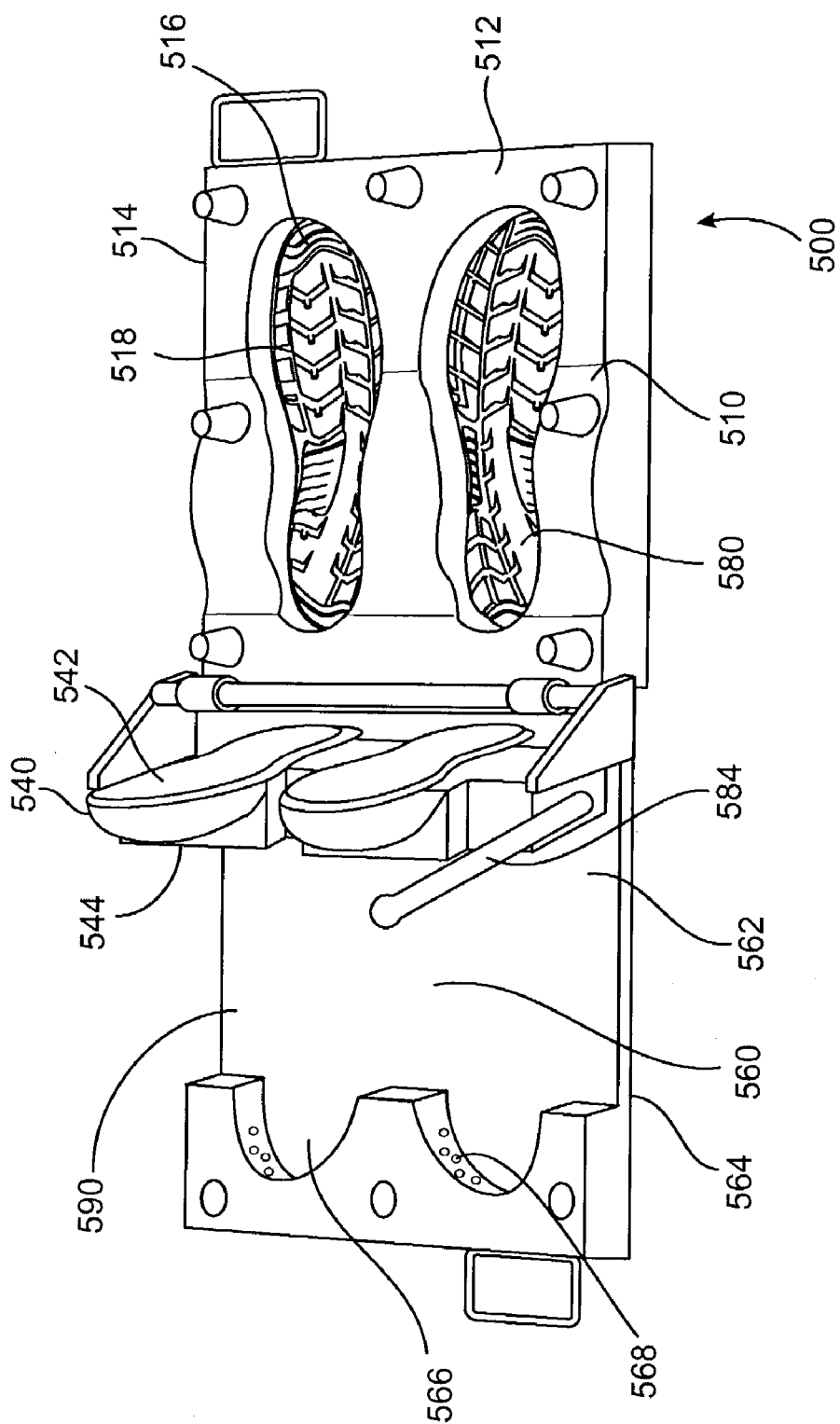
FIG. 16 is a perspective view of a mold for molding an outsole according to the present invention.

FIG. 16 shows a perspective view of a mold 500 for molding an outsole according to the present invention. The mold 500 includes a bottom plate 510, an inner toe cap plate 540 and an outer toe cap plate 560.

The bottom plate 510 has an inner surface 512 and an outer surface 514. The inner surface 512 of the bottom plate 510 has a first cavity 516 which forms the lower surface 22 of the outsole 20. A plurality of ridges 518 in the first cavity 516 form the traction elements 140 of the outsole 20. A first mold cavity 580 is formed by the closing of the inner toe cap plate 540 onto the bottom plate 510. The first mold cavity 580 forms the outsole 20 including the lower surface 22 of the outsole and the upper surface 24 of the outsole 20. The upper surface 24 of the outsole 20 is configured to support the lower surface 50 of the foot 40 including the heel 42, forefoot 44 and forefoot 46.

Figure 17:
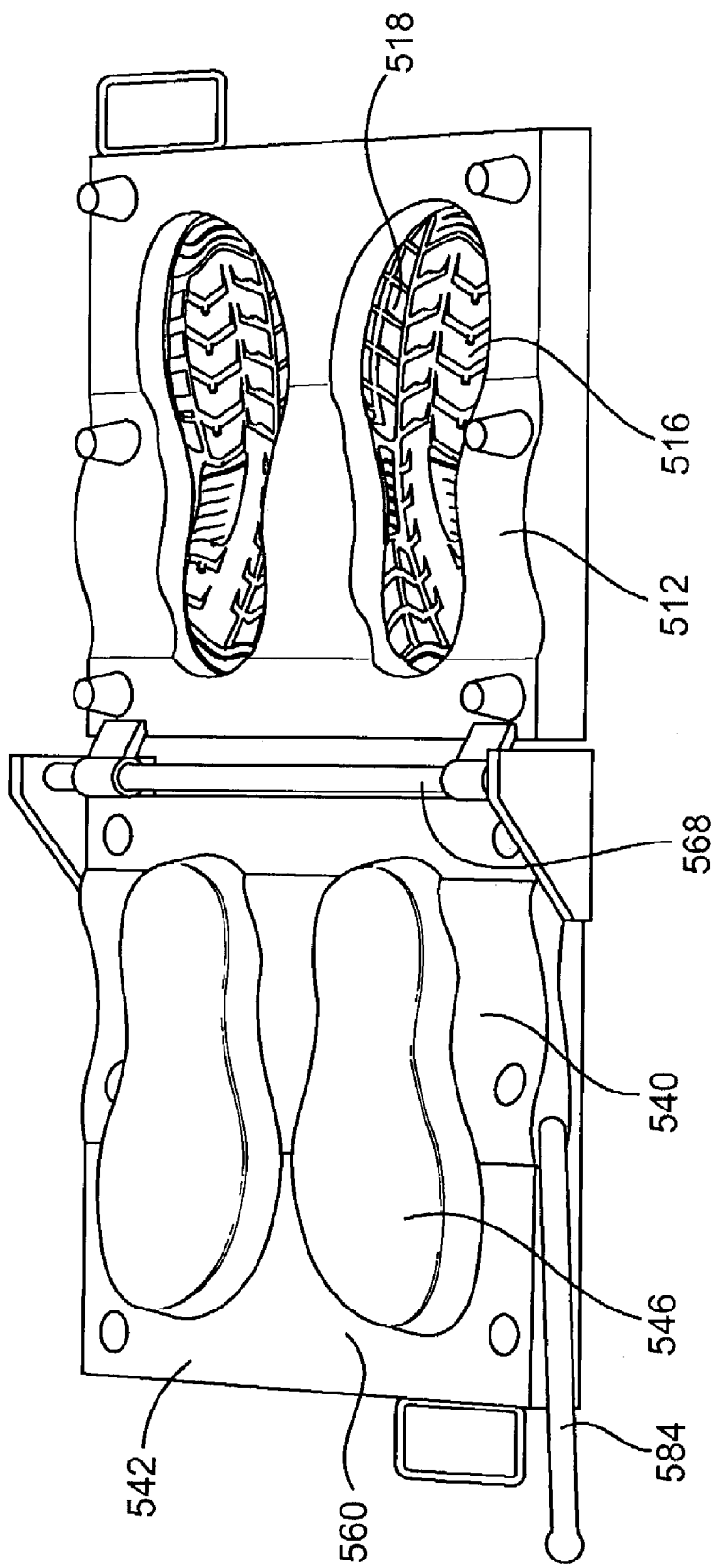
FIG. 17 is a perspective view of the bottom plate and inner toe cap plate of the mold for molding an outsole of FIG. 16.

FIG. 17 shows the bottom plate 510, the inner toe cap plate 540, and the outer toe cap plate 560 of FIG. 16. The inner toe cap plate 540 has an inner surface 542 and an outer surface 544. The inner surface 542 of the inner toe cap plate 540 has a pair of protrusions 546 which form the upper surface 24 of the outsole 20 and the inner cavity 28 of the toe cap 30. The protrusions 546 are in the shape of the upper surface 24 of the outsole 20. The outer toe cap plate 560 is movable with respect to the inner toe cap plate 540. A hinge 568 holds the bottom plate 510, the inner toe cap plate 540 and the outer toe cap plate 560 together.

Figure 18:
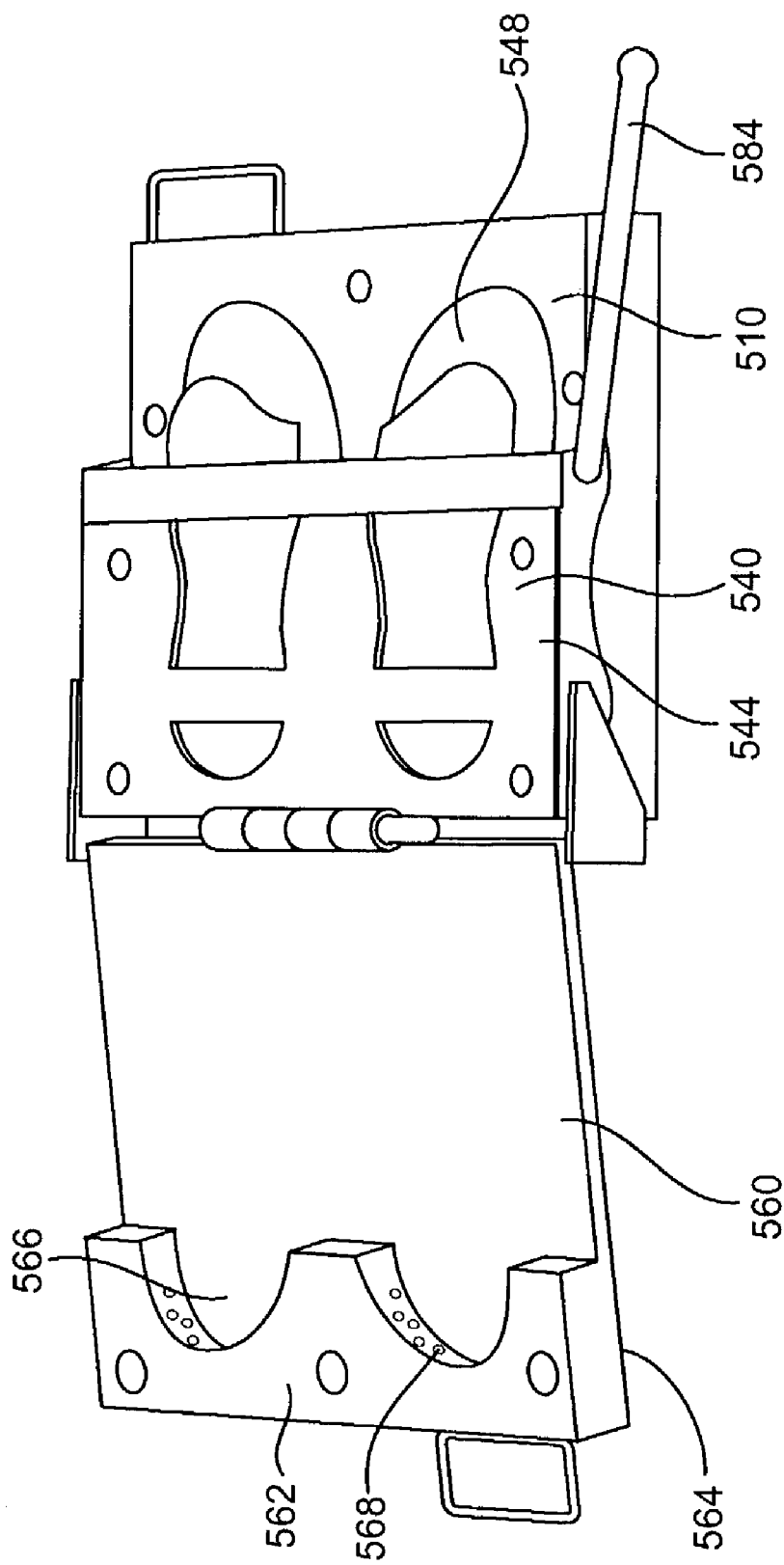
FIG. 18 is a perspective view of the inner toe cap plate and outer toe cap plate of the mold for molding an outsole of FIG. 16.

FIG. 18 shows the bottom plate 510, the inner toe cap plate 540 and the outer toe cap plate 560. The outer toe cap plate 560 has an inner surface 562 and an outer surface 564. The inner surface 562 of outer toe cap plate 560 and the inner surface 512 of the bottom plate 510 form a second mold cavity 590. The inner surface 562 of the outer toe cap plate 560 has a toe cap cavity 566. The toe cap cavity 566 forms the top surface of the toe cap 30. The second mold cavity 590 forms the toe cap 30 extending from the outsole 20 and configured to cover the top 54 of at least a portion of the forefoot 46. The toe cap 30 is molded integrally with the outsole 20.

Optionally, the toe cap cavity 566 has a plurality of protrusions 568 forming a plurality of holes 336 in the toe cap 30. The plurality of holes 336 allow water to drain from the sandal 10 if submerged in a wet environment during activities including, but not limited to, kayaking, water rafting, surfing, fishing or any activity wherein the sandal 10 could be submerged in a body of water.

Figure 19:
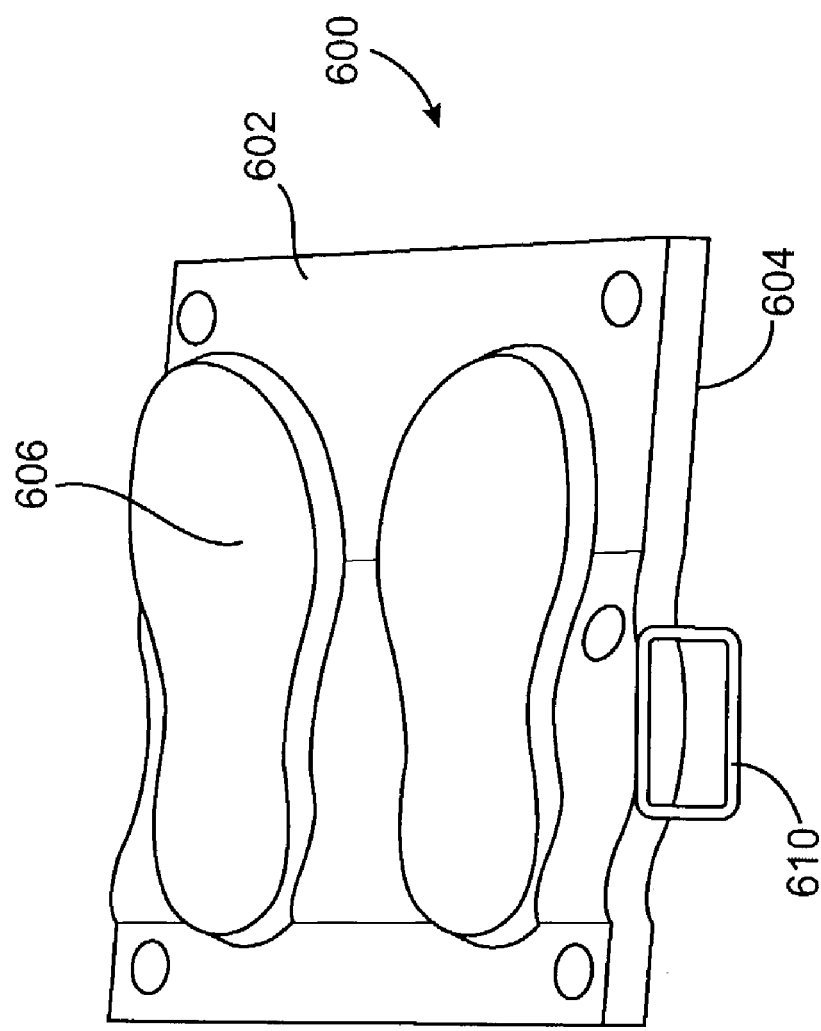
FIG. 19 is a perspective view of a mold for molding an outsole according to an alternative embodiment of the present invention.

In an alternative embodiment of the mold 500 for molding an outsole 20 according to the present invention includes a false plate 600. FIG. 19 shows the false plate 600 which is used to added different colors and/or different materials to the outsole 20. The false plate has an inner surface 602 and an outer surface 604. The false plate 600 is configured to be positioned between the bottom plate 510 and the inner toe cap plate 540. A protruding surface 606 on the inner surface 602 of the false plate 600 is configured to fit inside the first cavity 516 of the bottom plate 510. The protruding surface 606 prevents a first material from filling at least a portion of the bottom plate 510. Thus, the protruding surface 606 provides a means for adding a second material of either a different color than the first material and/or a different material composition.

Typically, the false plate 600 is preferably used to create an outsole 20 having a first color and a second color having a uniform composition. However, it can be appreciated that the false plate 600 can allow the outsole 20 to be constructed from a first material of one composition and a second material of a second composition. In molding an outsole having two different colors or different material compositions, the protruding surface 606 prevents the first material from filling a portion of the first cavity 516 of the bottom plate 510. The false plate 600 and bottom plate 510 are treated in an oven in a known manner to cure the first material. The false plate 600 is then removed, preferably by a handle 610, and a second material is added to the first cavity 516 of the bottom plate 510.

A method for the production of a molded outsole, the outsole 20 having a toe cap 30 extending from the outsole 20 and configured to cover a top of at least a portion of the forefoot 44, the toe cap 30 molded integrally with the outsole 20 is preformed as set forth below. The method preferably includes a mold 500 having a bottom plate 510, an inner toe cap plate 540, and an outer toe cap plate 560. As shown in FIG. 17, the first cavity 516 of the bottom plate 510 is filled with a first material. The first material is preferably a curable rubber, and more preferably a non-marking material. It can be appreciated, however, that any curable rubber or synthetic material can be used.

Once the first cavity 516 of the bottom plate 510 is filled, the inner toe cap plate 540 is closed around the bottom plate 510 as shown in FIG. 18. The inner toe cap plate 540 has a handle 584 for opening and closing the mold 500. The first mold cavity 580 is formed by closing the inner toe cap plate 540 onto the bottom plate 510. The first mold cavity 580 forms the molded rubber outsole 20 including the lower surface 22 and the upper surface 24 of the outsole 20.

An additional amount of the first material is then placed over the toe cap plate 548 of the protrusions 546 of the inner toe cap plate 540. This additional amount of the first material forms the toe cap 30. The inner toe cap plate 540 and the outer toe cap plate 560 are then closed forming the second mold cavity 590.

It can be appreciated that the toe cap 30 material can be the same as the outsole 20 or can be a different material. In addition, an additive can be added to the toe cap 30 to prolong the life of the outsole 20. For example, in one preferred embodiment, the toe cap 30 includes a synthetic butidine rubber to prevent the toe cap 30 from oxidizing, drying out and cracking from heat and other conditions. In addition, it is preferable that the first material and the second material are curable rubber or synthetic compounds.

The mold 500 is then treated in an oven in a known manner to cure the first material. It can be appreciated that an oven temperature of about 250° F. to about 300° F. is preferred. However, it can be appreciated that the curing temperature of the first material may vary depending on the type of material. In addition, the mold 500 is preferably treated for about 5 minutes to about 15 minutes to allow the first material to cure. Once again, the curing time of the first material may vary depending on the composition of the first material.

Once the first material has cured, the mold 500 is opened and the outsole 20 is removed. The outsole 20 preferably will be molded to the inner toe cap plate 540 and can be removed in a manner known to one skilled in the art including by hand.

In an alternative method of molding an outsole 20 according to the present invention, a false plate 600 as shown in FIG. 19 is added to the mold 500. The first material is placed in the first cavity 516 of the bottom plate 510 and is then covered with the false plate 600. The false plate 600 has a protruding surface 606 which prevents the first material from filling at least a portion of the bottom plate 510. The bottom plate 510 and the false plate 600 are treated in an oven in a known manner to allow the first material to cure. As set forth above, the first material is preferably a carbon rubber, and more preferably non-marking. However, it can be appreciated that a synthetic material also having non-marking properties can be used.

The false plate 600 is then removed, preferably by hand using the handles 610, and a second material is added to the first cavity 516 of the bottom plate 510. The second material is preferably of a different color and/or different material from the first material. The second material is also preferably a carbon rubber, and more preferably non-marking. A synthetic material can be used as well.

The inner toe plate 540 and the bottom plate 510 are then closed and additional first material is added to the second mold cavity 590 to form the toe cap 30. The inner toe cap plate 540 and the outer toe cap plate 560 are then closed forming the second mold cavity 590. The mold is then treated in an oven in a known manner to cure the first material and as described above.

After the first material has cured, the mold 500 is removed from the oven and the outsole 20 removed from the mold 500.

During the molding process, it is desirable to have the first material remain in the first mold cavity and the second mold cavity. However, variations in manufacturing process, settling of parts, and other factors can produce excess material, or seepage of material beyond its desired location into other areas of the mold 500. Thus, it is desirable to reduce the excess material or seepage to the greatest extent possible. Accordingly, the excess material or seepage can be trimmed by hand or other means in order to produce a finished outsole 20 which can than be assembled in a sandal or athletic shoe as set forth below.

The molds 500, 600 and method of manufacturing an outsole 20 configured to support a lower surface of a foot 40, including a toe cap 30 extending from the outsole 20 and configured to cover a top of at least a portion of the forefoot 44, is not limited to sandals and the construction thereof. It can be appreciated that the mold 500, including the false plate 600, and method of manufacturing, can be used to produce not only outsoles for sandals, but athletic shoes, hiking boots, hiking shoes, running shoes and any other type of footwear that an outsole 20 with a toe cap 30 is desirable.

The mold 500 for manufacturing an outsole has been described above in terms of a compression mold. However, it can be appreciated that the mold 500 can also be used as an injection mold in a manner known to one skilled in the art.

A preferred method for manufacturing and assembly of a sandal 10 as described herein will now be described in more detail.

The plurality of straps 60 are cut from conventional materials, such as real or synthetic leather, nylon or rubber. The plurality of straps 60 are arranged by mating pieces of materials and securing the material in a prearranged pattern as desired. For example, as shown in FIGS. 1–13, the side straps 134 of the sandal straps 60 are attached to the first strap 130 by inserting the side straps through the opening 132 in the first strap 130. The straps 60 including the first strap 130, side straps 134 and rear assembly 120 preferably has a lining 140 of neoprene or other conventional lining material.

The lining 140 is cut from neoprene or other conventional lining material, and preferably covers all exposed undersurfaces of the sandal straps 60. The sandal straps 60 are sewn or glued, or a combination thereof to the to the lining 140. Preferably, the inner pieces are stitched to the lining 140 around their entire periphery and the outer pieces are stitched to the lining 140 only near their lower ends. Additional conventional cushioning and lining materials can be added to the sandal straps as desired.

In the embodiments having a rear assembly 120 including the ankle strap 122 and heel strap 124, the rear assembly 120 is preferably manufactured from the same conventional materials, such as real or synthetic leather as the sandal straps. The ankle strap 122 and the heel strap 124 are cut and either glued, stitched or glued and stitched together to form the rear assembly 120.

The anatomical anti-odor footbed 90 is cut from a roll of an anti-odor material preferably manufactured by Aegis™. The footbed 90 however, can also be cut from a roll of nylon, leather or any other material providing a desirable material for a footbed 90.

The inner midsole 100 is preferably molded from an EVA material such as phylon in the shape of the inner midsole 100 by conventional molding techniques including compression molding and injection molding.

The insole 80 is formed by combining the pre-cut footbed 90 and the molded inner midsole 100. The footbed 90 and the inner midsole 100 are then molded together by conventional techniques and apparatus. It can also be appreciated that the insole 80 can be one piece mold using conventional techniques. If the insole 80 is a one piece mold, it preferably will have an EVA footbed 90 and inner midsole 100.

The outer midsole 110 is molded from preferably a shock absorbing foam-like material, such as a thermoplastic synthetic resin foam, such as an ethylene-vinyl acetate copolymer (EVA), thermosetting resin foam, such as polyurethane (PU), or rubber material foam, such as butadiene or chloroprene rubber using conventional molding techniques and apparatus. It can be appreciated that the outer midsole 110 can also include a natural cork material or a synthetic cork material like EVA.

The outsole 20 is preferably molded from rubber, carbon rubber or other conventional outsole materials using conventional molding techniques and apparatus including injection and compression molding. However, the molding of outsole 20 is used as follows to form the toe cap 32.

The outsole 20 and the outer midsole 110 is usually glued together to form an outsole assembly 112. In an alternative embodiment, the outsole 20 and the outer midsole can be molded as a single piece. If the outsole 10 and the outer midsole 110 are one piece molded a carbon rubber or rubber is preferred.

The sandal 10 is assembled by passing the free ends of the side straps into the corresponding strap receiving grooves. The free ends of the various components are then secured to the lower surface of the inner midsole 100, preferably using glue, cement or other conventional adhesives. Similarly, the rear strap assembly 120 is attached to the lower surface of the inner midsole 100 by passing the free ends of the side straps into the corresponding strap receiving grooves.

The outsole 20 and the outer midsole 110 are glued together forming an outsole assembly 112. The plurality of straps 60 and insole 80 is then assembled with the outsole 20 and midsole 100 by glueing or cementing the lower surface of the inner midsole 100 to the upper surface of the outer midsole 110. The insole including the toe cap material and straps are glued to the inner cavity of the toe cap.

The present invention is described in connection with a sport sandal having a sole and plurality of straps that are specifically configured for high-performance use. The present invention is, however, well suited for use in other types of sandal construction. In this application, the terms lower, top, inside, exterior, and upper are used to denote directions relative to the geometric center of the described component unless otherwise noted.

While the invention has been described in detail with reference to the preferred embodiments thereof, it will be apparent to one skilled in the art that various changes and modifications can be made and equivalents employed, without departing from the present invention.

What is claimed is:

1. A sandal comprising:
   a molded rubber outsole configured to support a lower surface of a foot including a heel, a midfoot, and a forefoot;
   a toe cap extending from the outsole and configured to cover a top of at least a portion of the forefoot,
   a toe cap cover; and
   a plurality of sandal straps fixed to the outsole to retain the sandal on the foot, wherein at least one of the sandal straps is adjustable in tightness about the wearer's foot, and at least one of the sandal straps is fixed to the toe cap.

2. The sandal of claim 1, wherein the toe cap includes a lower surface facing a top surface of the outsole and spaced from the outsole.

3. The sandal of claim 2, wherein at least one of the sandal straps is fixed to the lower surface of the toe cap.

4. The sandal of claim 2, further comprising an insole positioned on the top surface of the outsole and having a forefoot insole portion disposed between the top surface of the outsole and the lower surface of the toe cap.

5. The sandal of claim 4, wherein the outsole has upwardly extending side surfaces extending rearwards from the toe cap and defining the lateral and medial sides of the outsole and each having an upper edge.

6. The sandal of claim 5, wherein the insole has an upper foot supporting surface which is substantially even with the upper edges of the side surfaces of the outsole.

7. The sandal of claim 4, wherein at least two of the sandal straps are fixed between the outsole and the insole.

8. The sandal of claim 4, wherein the insole includes a footbed and an inner midsole.

9. The sandal of claim 8, wherein at least two of the sandal straps are fixed between the inner midsole and the outsole.

10. The sandal of claim 1, wherein the at least one sandal strap that is fixed to the toe cap is fixed to the toe cap by glue.

11. The sandal of claim 1, wherein the toe cap is configured to cover a top of at least one half of the length of at least three toes.

12. The sandal of claim 1, wherein the toe cap is reinforced with an additive.

13. The sandal of claim 12, wherein the additive is fiberglass.

14. The sandal of claim 12, wherein the additive is a synthetic material.

15. The sandal of claim 1, wherein the plurality of sandal straps are separated by sandal openings through which the foot inside the sandal is exposed to the exterior of the sandal.

16. The sandal of claim 1, further comprising an outer midsole positioned on the top surface of the outsole.

17. The sandal of claim 16, wherein the outer midsole includes a cork-like additive.

18. The sandal of claim 16, further comprising an insole positioned on a top surface of the outer midsole.

19. The sandal of claim 18, wherein the outsole has upwardly extending side surfaces extending rearwards from the toe cap and defining the lateral and medial sides of the outsole and each having an upper edge.

20. The sandal of claim 19, wherein the insole has an upper foot supporting surface which is substantially even with the upper edges of the side surfaces of the outsole.

21. The sandal of claim 18, wherein the insole includes a footbed and an inner midsole.

22. The sandal of claim 21, wherein the footbed includes an anti-microbial material.

23. The sandal of claim 21, wherein the toe cap includes a toe cap liner which is fixed between the inner midsole and the outer midsole.

24. The sandal of claim 21, wherein at least two of the straps are fixed between the inner midsole and the outer midsole.

25. The sandal of claim 24, wherein the inner midsole has a plurality of strap receiving groves located on an edge of the inner midsole.

26. The sandal of claim 25, wherein the strap receiving grooves extend from an edge of the insole toward an inner portion of the insole.

27. The sandal of claim 25, wherein the strap receiving grooves intersect an upper foot supporting surface of the insole.

28. The sandal of claim 25, wherein the inner midsole has a plurality of strap receiving grooves located on the lower surface of the inner midsole.

29. The sandal of claim 28, wherein the strap receiving grooves each have a width substantially equal to a width of the corresponding straps and a depth substantially equal to a depth of the corresponding straps.

30. The sandal of claim 25, wherein the plurality of strap receiving grooves are positioned on an outer edge of the insole.

31. The sandal of claim 1, wherein the toe cap includes a toe cap liner.

32. The sandal of claim 31, wherein the toe cap liner is fixed to the sandal straps.

33. The sandal of claim 1, wherein the sandal straps include a plurality of openings for a shoe lace.

34. The sandal of claim 1, wherein the outsole has a plurality of durometers.

35. The sandal of claim 1, wherein the sandal straps are formed of a material different from the molded rubber outsole.

36. The sandal of claim 1, wherein the sandal straps are formed separately from the outsole and the toe cap.

37. The sandal of claim 1, wherein the toe cap is integrally molded with the outsole.

* * * * *